United States Patent Office 3,631,098
Patented Dec. 28, 1971

3,631,098
EXTRACTING 4-p-TOLYLVALERIC ACID FROM DOUGLAS FIR
Carl T. Redemann, Walnut Creek, Calif., assignor to The Dow Chemical Company, Midland, Mich.
No Drawing. Filed Sept. 18, 1969, Ser. No. 859,186
Int. Cl. C07c 51/48
U.S. Cl. 260—525          7 Claims

ABSTRACT OF THE DISCLOSURE

When Douglas fir wood is contacted with a suitable non-polar, water-immiscible solvent, 4-p-tolylvaleric acid is extracted. This acid may then be removed from the extract by conventional means.

BACKGROUND OF THE INVENTION

Rupe and Steinback in Berichte, 44, 584 (1911) teach a method of making 4-p-tolylvaleric acid. This method and all other such methods of producing 4-p-tolylvaleric acid employ methyl magnesium halide and are consequently quite costly.

SUMMARY OF THE INVENTION

It has now been discovered that 4-p-tolylvaleric acid may be removed from Douglas fir wood by extracting Douglas fir with a non-polar, water-immiscible organic solvent in which 4-p-tolylvaleric acid is at least partially soluble.

In a preferred practice of the invention, a large quantity of Douglas fir sawdust is placed in an extraction apparatus and extracted exhaustively with a desirable non-polar solvent such as methylene chloride. The solvent is removed from the sawdust and the extracts are concentrated by evaporation. Aqueous caustic is then added to the concentrated extract to give a pH greater than 10. The aqueous and organic layers thus formed are separated, and the aqueous layer is acidified with a strong acid to a pH of about 3. The acidified aqueous layer is then extracted with a suitable organic solvent to remove the 4-p-tolylvaleric acid and the desired acid is separated from the solvent by distillation.

The Douglas fir wood used in the present invention for the extraction is well known and readily available. Such Douglas fir wood is obtained from trees having the scientific name *Pseudotsuga taxifolia*. Small pieces of Douglas fir wood are preferably used in the extraction so that the extracting solvent can easily dissolve the 4-p-tolylvaleric acid in the wood fibers. Douglas fir sawdust is especially preferred in the invention because of its small particle size.

The solvent of the present invention may be essentially any non-polar, water-immiscible organic solvent in which 4-p-tolylvaleric acid is at least partially soluble. A large number of such solvents are well known and readily available. To determine whether a possible non-polar, water-immiscible solvent is a suitable extraction solvent in the present invention, a small amount of 4-p-tolylvaleric acid may be contacted with the particular solvent to determine whether an acceptable amount of solubility is shown. Representative examples of suitable solvents that may be used in the extraction of Douglas fir wood include liquid hydrocarbons, liquid chlorinated hydrocarbons, liquid ethers or mixtures thereof. Specific examples of such solvents, include: aliphatic hydrocarbons such as pentane, hexane, heptane and hexane; cycloaliphatic hydrocarbons such as cyclohexane and cyclopentadiene; aromatic hydrocarbons such as benzene, toluene and xylene, chlorinated aliphatic hydrocarbons such as methylene chloride, chloroform, carbon tetrachloride, ethylene dichloride, 1,1,1-trichloroethane and perchloroethylene; chlorinated aromatic hydrocarbons such as mono- and dichlorobenzene, and p-chlorotoluene; and aliphatic ethers such as diethyl ether, dipropyl ether, diallyl ether and tetrahydrofuran. Of these suitable solvents, methylene chloride is preferred.

The amount of solvent employed in the extraction may vary widely. Essentially any amount that gives the desired degree of extraction may be employed. As a matter of convenience, the extraction is most rapidly accomplished by employing substantial excesses of the solvent and then concentrating the solvent after extraction. Such excess amount depends upon the desired rapidity of the extraction and upon the solubility of the 4-p-tolylvaleric acid in the solvent.

The temperature at which the extraction is conducted may vary widely. Generally, temperatures of about 0° to about 100° C. or more are employed. Since the temperature does not materially affect the extraction, ambient temperature is preferred.

The time of extraction reaction is not critical. The time is essentially dependent upon the solvent employed, the temperature, the amount of 4-p-tolylvaleric acid to be extracted from the wood and the solubility of the 4-p-tolylvaleric acid in the particular solvent. The best extraction time may be easily determined on an individual basis by experience.

After the 4-p-tolylvaleric acid has been extracted into the solvent, it may be separated from the solvent by conventional separation techniques. Although the product may be separated from the extract directly by a fractional distillation, a number of the impurities in the extract make such fractional distillation difficult at best. A preferred and novel feature of the present invention is the isolation of the 4-p-tolylvaleric acid by adding aqueous caustic such as sodium or potassium hydroxide to the extract to give a pH greater than 10, separating the aqueous and organic layers, acidifying the aqueous layer with a strong acid to a pH less than 4, and separating the 4-p-tolylvaleric acid from the acidic aqueous solution. The desired acid may be isolated from the aqueous layer by fractional distillation or preferably by extracting it from the aqueous solution with a suitable organic solvent and then fractionally distilling the extract.

Thus, in the present invention it has been discovered that 4-p-tolylvaleric acid exists in Douglas fir and also that such acid may be extracted by contacting Douglas fir wood with a non-polar, water-immiscible organic solvent in which the 4-p-tolylvaleric acid is at least partially soluble. This recovery of 4-p-tolylvaleric acid by extraction has a substantial advantage over synthetic preparations of this fungistatic material since it is more convenient and economical.

SPECIFIC EMBODIMENT

Ten kg. of sawdust from Douglas fir was placed into an extraction apparatus and extracted exhaustively with methylene chloride. The methylene chloride extract was separated from the Douglas fir, concentrated by evaporation to a volume of 1 liter and made basic with 400 ml. of 2 N sodium hydroxide. The aqueous phase was separated from the methylene chloride layer and acidified to a pH of 3 with 6 N hydrochloric acid. The acidic aqueous phase was then extracted with 200 ml. of methylene chloride, the methylene chloride extract was washed with 200 ml. of water and the aqueous and organic layers were separated. Methylene chloride was evaporated from the organic layer and the residue was distilled in a high vacuum distillation apparatus through a 12 inch Widemar fractionating column to yield 32 grams of essentially pure 4-p-tolylvaleric acid boiling at 135° C. at 0.3 mm. Hg.

In the same manner as described by the above example, other solvents such as hexane, cyclohexane, heptane, benzene, diethyl ether, chloroform, carbon tetrachloride, ethylene dichloride and chlorobenzene may be used to extract 4-p-tolylvaleric acid from Douglas fir wood at temperatures of 0° to 100° C. for 20 hours.

I claim:

1. A process for removing 4-p-tolylvaleric acid from Douglas fir (*Pseudotsuga taxifolia*) comprising contacting Douglas fir wood with a liquid non-polar, water-immiscible organic solvent in which 4-p-tolylvaleric acid is at least partially soluble selected from the group consisting of an aliphatic hydrocarbon, cycloaliphatic hydrocarbon, aromatic hydrocarbon, chlorinated aliphatic hydrocarbon, chlorinated aromatic hydrocarbon, aliphatic ether or mixture thereof, and separating the extract.

2. The process of claim 1 wherein the small pieces of Douglas fir wood are extracted.

3. The process of claim 2 wherein the Douglas fir sawdust is extracted.

4. The process of claim 1 wherein the solvent is pentane, hexane, heptane, cyclohexane, methylene chloride, methyl chloroform, carbon tetrachloride, ethylene dichloride, benzene, toluene, chlorobenzene, diethyl ether or mixture thereof.

5. The process of claim 4 wherein the solvent is methylene chloride.

6. The process of claim 1 wherein separation comprises the additional steps of:

adding aqueous caustic to the extract until the extract has a pH of greater than 10, separating the aqueous and organic layers, acidifying the aqueous layer with a strong acid to a pH of less than 4, and removing the 4-p-tolylvaleric acid from the acidic aqueous solution.

7. The process of claim 6 wherein the 4-p-tolylvaleric acid is removed from the acidic aqueous layer after acidification by extracting the aqueous solution with a suitable organic solvent to remove the 4-p-tolylvaleric acid and then fractionally distilling the extract.

No references cited.

JAMES A. PATTEN, Primary Examiner

R. S. WEISSBERG, Assistant Examiner